Aug. 7, 1962 J. U. WHITE 3,048,080
SPECTROSCOPIC DEVICE
Filed Nov. 2, 1959 4 Sheets-Sheet 1

Aug. 7, 1962  J. U. WHITE  3,048,080
SPECTROSCOPIC DEVICE
Filed Nov. 2, 1959  4 Sheets-Sheet 4

United States Patent Office 3,048,080
Patented Aug. 7, 1962

3,048,080
SPECTROSCOPIC DEVICE
John U. White, Darien, Conn. (% The White Development Corp., 80 Lincoln Ave., Stamford, Conn.)
Filed Nov. 2, 1959, Ser. No. 850,124
20 Claims. (Cl. 88—14)

This invention relates to optical apparatus and more particularly to such apparatus of the type which is adapted to produce an optical image through the use of mirrors.

Optical apparatus of the type to which the present invention is directed is particularly suited for use in spectrometers. Thus, for example, such apparatus illustratively may be employed in a monochromator or other device for producing a substantially monochromatic portion of a spectrum.

It will be understood that a monochromator may include an entrance slit for admitting light from a source, a collimator, such as a mirror, a dispersing element, such as a prism or a diffraction grating, and an exit slit. Light entering from the entrance slit is reflected by the collimator, is dispersed into a spectrum by the dispersing element, and is reformed into a dispersed image of the entrance slit in the region of the exit slit, so that, by positioning the exit slit relative to the dispersed image, a selected, almost monochromatic portion of the spectrum is obtained. (As used herein, the term "light" is not restricted to visible light, but may include radiation having wave lengths longer or shorter than the visible spectrum). Light emerging through the exit slit may be observed visually or measured instrumentally.

Heretofore, monochromators or other image forming apparatus using mirrors as collimating or focusing elements have exhibited several disadvantages. For example, in many types of such previous apparatus, the mirrors introduced aberrations in the optical images with the result that the accuracy and resolution of the image was impaired.

These aberrations for the most part orginate by reason of the particular configuration and disposition of the collimating or focusing mirrors and have been of special moment in situations in which a number of mirrors are employed or in which the light is reflected several times by a single mirror, as in cases where it is desired to disperse the light by means of the dispersing element more than once.

As an illustration, particularly in cases where a spherical mirror is employed and it is assumed that the mirror is placed in parallel light to form an image in the center of the light beam from a very distant object point, the reflected light rays cross the optical axis of the mirror at various points. As a result, the image is smeared in the manner known as spherical abberration. In situations in which the mirror is placed in parallel light and is disposed at an oblique angle with respect thereto so as to form an image to one side of the incident light beam, it has been ascertained that additional abberrational effects occur which likewise result from the spherical configuration of the mirror. The nature of one of the more important of these additional aberrations may be ascertained by considering the rays of light reflected from a small segment of the spherical mirror. If the light ray reflected from the center of the mirror segment is referred to as a "principal ray" and the light rays reflected from the edges of the segment are designated "side rays," the side rays do not meet the principal ray at a single point but cross it at various points, with the result that the image is highly aberrational. Conversely, as a result of this aberrational effect, incident light rays originating from a point or area that is spaced from the optical axis of a spherical mirror, such as a collimator, for example, are not reflected along parallel paths. (The term "optical axis," as used herein, denotes a line between the center of curvature of a spherical or cylindrical mirror and a point at the intersection of the mirror surface and the principal light ray incident thereto.)

This additional aberration is referred to herein as "off-axis abberration" and is of particular importance in monochromators and in other optical apparatus in which the formation of an accurate and well-defined image is either necessary or desirable. As in the case of spherical aberrations, the off-axis aberration in the image may be reduced or eliminated through the use of parabolic mirrors or mirror segments. However, the difficulties of fabricating such parabolic mirrors and particularly off-axis segments thereof, along with the accompanying high cost, have made their usage almost prohibitive for many optical applications.

As another illustration of aberrations which heretofore have impaired the accuracy and resolution of the optical image, the side light rays reflected from a mirror in a given plane including the reflected principal ray (the primary plane) frequently intersect this principal ray at one point, while the reflected side light rays in a plane which is at right angles to the primary plane and likewise includes the reflected principal ray (the secondary plane) intersect this principal ray at another point. Aberrations of this latter type are known as astigmatism and, as in the case of off-axis aberrations, are of special moment in cases where the mirror is employed "off-axis": that is, where the incident light rays originate from a point or area that is spaced from the optical axis thereof.

One general object of this invention is to provide new and improved optical apparatus which is particularly adaptable for producing an optical image through the use of mirrors.

More specifically, it is an object of this invention to to provide such an apparatus wherein the accuracy and resolution of the image is improved.

Another object of this invention is to reduce the adverse effects of aberrations in apparatus of this type.

Still another object of this invention is to provide an optical apparatus of comparatively simple construction which is economical to manufacture and thoroughly reliable in operation.

In one illustrative embodiment of this invention, there is provided, in an apparatus for producing a portion of a spectrum, an entrance slit for admitting light from a source, an exit slit, collimating means and a dispersing element for forming at the exit slit a dispersed image of the entrance slit, and first and second reflective means. The light rays from the source pass through the entrance slit and are reflected toward the collimating means by the first reflective means. These rays are directed by the collimating means to the dispersing element and are dispersed thereby. The dispersed light rays are again directed toward the collimating means, where they are reformed and are directed toward the second reflective means. The light is then received by the second reflective means and is directed thereby toward the region of the exit slit.

In accordance with one feature of this invention, the configuration and disposition of the reflective means are such that controlled aberrations are introduced which are of a sense opposite to the aberrations resulting from the collimating means. As a result, the net aberrations in the exit slit image are reduced, and the resolution and accuracy of the apparatus are improved.

More specifically, in accordance with a feature of the invention, the reflecting surfaces of the first and second reflective means are curved and are employed "off-axis." That is, the light rays incident thereto at the entrance slit, or the collimating means, as the case may be, are spaced from the optical axis of the corresponding reflective means. In certain advantageous arrangements, the curvature and disposition of these reflecting surfaces are such as to introduce a net off-axis aberration which compensates for the off-axis aberration resulting from the use of the collimating means. As a result, a highly accurate dispersed image of the entrance slit appears at the exit slit.

In accordance with another feature of the invention, in some embodiments, the curvature of the first and second reflective means is such that a net amount of astigmatism is introduced thereby. This astigmatism is of a magnitude and sense sufficient to compensate for the astigmatic effects resulting from the collimating means, thereby further improving the resolution and accuracy of the image at the exit slit.

In accordance with a further feature of the invention, in certain particularly good arrangements, there is provided an apparatus for producing a portion of a spectrum which enables the substantial elimination of both astigmatic and off-axis aberrations, thereby insuring an extremely accurate representation of the dispersed image at the exit slit.

The present invention, as well as further objects and features thereof, will be understood more clearly and fully from the following detailed description of certain preferred embodiments thereof, when read in conjunction with the accompanying drawings, in which.

Figure 1:
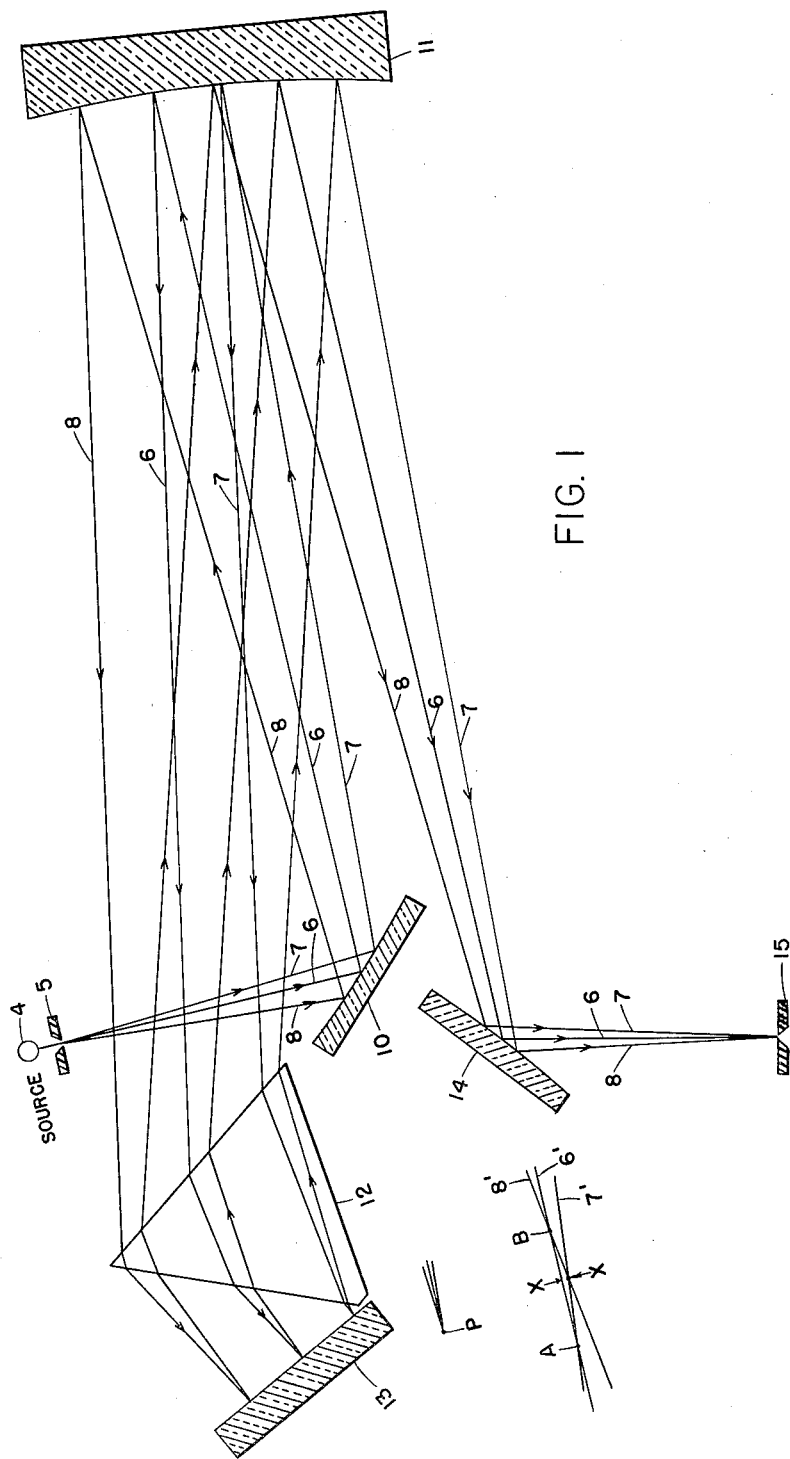
FIGURE 1 is a schematic horizontal view, partly in section, of a monochromator constructed in accordance with one illustrative embodiment of the invention.

In the embodiment of the invention shown in FIGURE 1, a pencil of light enters the apparatus from a suitable source 4 through an entrance slit which is defined by a pair of jaws 5. This light (visible or invisible) illustratively may be derived from or affected by a sample, the characteristics of which are to be determined. For example, the sample itself may be caused to radiate, or light may be passed through it before or after passing through the monochromator.

The light entering through the entrance slit comprises radiant energy, the path of which is represented schematically by a principal ray 6 and two side rays 7 and 8. The rays of light pass through the entrance slit and are reflected by an angularly disposed concave mirror 10 toward a collimator 11, which illustratively may comprise a spherically concave mirror. The light at the entrance slit is spaced a considerable distance from the optical axis of the concave mirror 10, and, in the FIGURE 1 embodiment, the principal ray 6 meets this axis at an angle of approximately forty-five degrees. Additionally, the mirror 10 is positioned such that the light rays reflected therefrom are spaced from the axis of the collimator 11, and the principal ray 6 approaching the collimator intersects the axis thereof at a small oblique angle. With this arrangement, the angle of incidence of the light striking the mirror 10 is large with respect to the angle of incidence of the light at the collimator, for purposes that will become more fully apparent hereafter.

The light rays 6, 7 and 8 then pass from the collimator 11, through a prism 12 where they are dispersed, strike a Littrow mirror 13, are returned to the prism 12 for a second dispersion and are again directed toward the collimator 11. The prism 12 is positioned such that, after the second dispersion, the principal light ray 6 intersects the optical axis of the collimator 11 at a small oblique angle.

The dispersed light rays 6, 7 and 8 are refocused by the collimator 11 and are directed toward a convex mirror 14. The mirror 14 is angularly disposed with respect to the collimator 11 in a manner such that the dispersed principal ray 6 from the collimator meets the optical axis of mirror 14 at an angle that is approximately forty-five degrees. As in the case of the mirror 10, the angle of incidence of the light striking the mirror 14 is large when compared to the angle of incidence of the light at the collimator.

The dispersed light rays are reflected by the mirror 14 toward a pair of jaws 15 which define an exit slit. As a result, a dispersed image of the entrance slit, defined by the jaws 5, is formed in the region of the exit slit, so that, by positioning the exit slit relative to the dispersed image, a selected portion of the light spectrum is obtained between the exit slit jaws 15. As will be understood, the selected portion of the spectrum may be observed visually, or it may be measured instrumentally, such as by a photomultiplier tube (not shown) or other sensing device which receives the light emerging through the exit slit and generates a voltage related to the intensity of the radiation at the selected portion of the spectrum.

In optical apparatus of the type employing reflective devices, such as the collimator 11, aberrations exit which, if uncorrected, would impair the resolution and accuracy of the optical image. Of particular importance in apparatus of the type shown in FIGURE 1 is the off-axis aberration resulting primarily from the spherical configuration of the collimator and the use of the collimator "off-axis." The nature of this off-axis aberration is such that the light rays forming the optical image do not meet the principal ray at the intended focal point but for the most part come together at several points on the principal ray which are spaced from the focal point. Thus, in FIGURE 1, if the mirrors 10 and 14 are removed from the apparatus and it is assumed that the light directed toward the collimator 11 emanates from a virtual point source P, the dispersed light ray 7', upon reflection by the collimator 11, will strike the principal ray 6' at a point A, which is farther from the collimator than the intended focal point. The dispersed light ray 8', on the other hand, will intersect the principal ray 6' at a point B, a point closer to the collimator than the intended focal point. As a result, the image in the vicinity of A—B will be highly aberrational. The magnitude of the error caused by the off-axis aberration introduced by the collimator is roughly proportional to the distance from the intersection of the side rays 7' and 8' to the principal ray 6', when measured in a direction perpendicular to the principal ray. This distance is indicated in FIGURE 1 by arrows X—X.

The angularly disposed mirrors 10 and 14 introduce off-axis aberrations which are additive and are of a sense opposite to the off-axis aberration resulting from the collimator 11. The off-axis aberration introduced by the concave mirror 10 is such that the reflected side ray which corresponds to the side ray 7' crosses the reflected principal ray at a point closer to the mirror 10 than the side ray corresponding to the reflected side ray 8'. The sense of this introduced aberration is thus opposite to the off-axis aberration which results from the collimator.

The angular position of the mirror 14 is reversed with respect to that of the mirror 10. That is, the extended optical axis of the mirror 10 passes on one side of the collimator while that of the mirror 14 passes on the opposite side thereof. In FIGURE 1, the planes of the mirrors 10 and 14 intersect at approximately a right angle. Thus, although the curvature of the mirror 14 is opposite to that of the mirror 10 (i.e., convex rather than concave), for purposes that will become more fully apparent hereafter, the off-axis aberration introduced by mirror 14 is such that the reflected side ray which corresponds to the side ray 7' crosses the reflected principal ray closer to the mirror 14 than the side ray corresponding to the reflected side ray 8'. Consequently, the sense of this introduced off-axis aberration is the same as the sense of the off-axis aberration introduced by the mirror 10 and is opposite to that of the off-axis aberration which results from the use of the collimator 11. As a result, the off-axis aberration in the exit slit image which results from the collimator is reduced by the off-axis aberrations introduced by the mirrors 10 and 14.

As indicated heretofore, the angle of incidence of the light striking each of the mirrors 10 and 14 is large with respect to the angle of incidence of the light at the collimator. In addition, the angular positions and powers of these mirrors are chosen such that the sum of the off-axis aberrations introduced by mirrors 10 and 14 is equal and opposite to the off-axis aberration resulting from the collimator. These aberrations thereby cancel each other, and an extremely sharp and well-defined image appears at the exit slit between the jaws 15.

In the FIGURE 1 embodiment of the invention, the powers of the mirrors 10 and 14 are opposite; that is, the mirror 10 is concave while the mirror 14 is convex. As a result, the astigmatism contributed by the mirror 10 is of a sense opposite to that contributed by the mirror 14, and these two mirrors together do not contribute significant amounts of astigmatism in the image at the exit slit. In addition, the radii of curvature of the mirrors 10 and 14 are relatively long, (although they are not necessarily equal), with the result that their contributions of other third order aberrations, such as coma, distortion, etc., are relatively small, and a highly accurate image appears at the exit slit.

Figure 2:
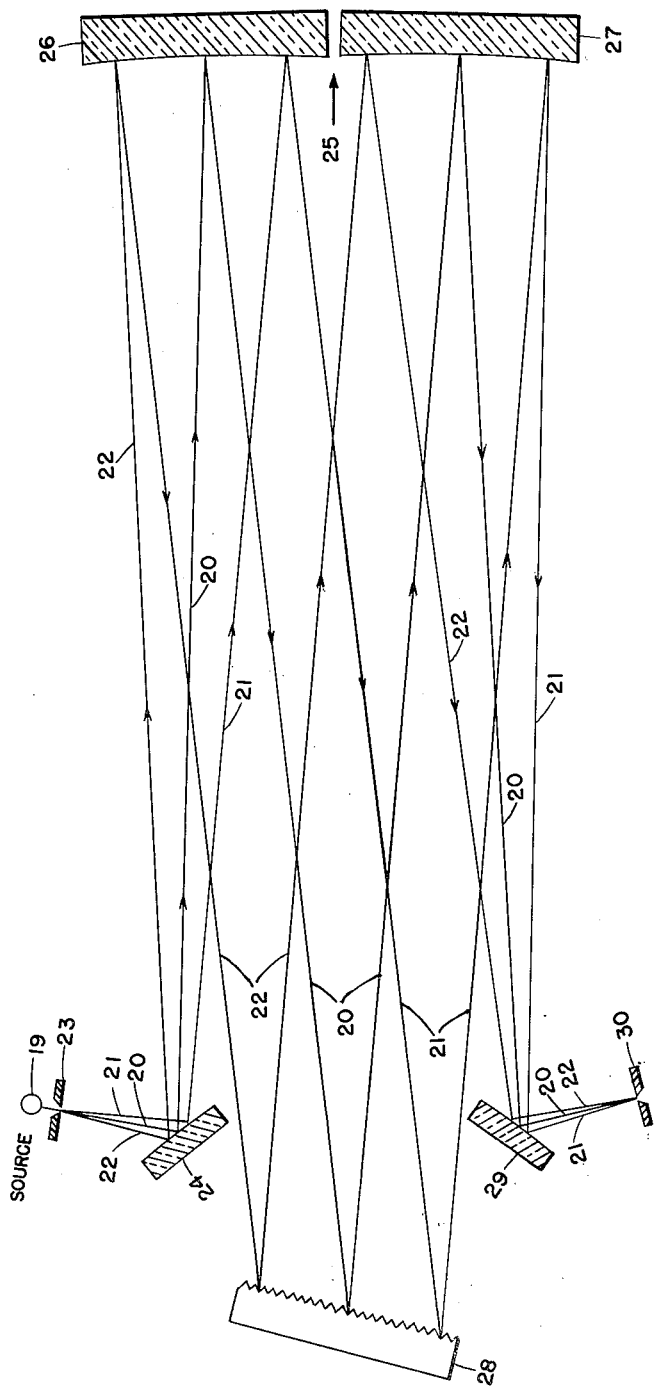
FIGURE 2 is a schematic horizontal view, partly in section, of a monochromator constructed in accordance with another illustrative embodiment of the invention.

FIGURE 2 is illustrative of one form of grating monochromator constructed in accordance with the invention. A pencil of light, represented schematically by a principal ray 20 and two side rays 21 and 22, enters the apparatus from a suitable source 19 through a pair of jaws 23 which form an entrance slit. The light rays 20, 21 and 22 are directed from the entrance slit to an angularly disposed, convex mirror 24 and are reflected thereby toward a collimating device 25 which comprises two mirrors 26 and 27. The mirrors 26 and 27 are each spherically concave and are disposed in substantial coplanar alignment with each other.

The light rays 20, 21 and 22 from the convex mirror 24 are received by the collimating mirror 26 and are reflected thereby toward a diffraction grating 28 which comprises the dispersing element of the monochromator. The light rays are diffracted by the grating 28 and are returned to the collimating device 25 where they strike the mirror 27. The diffracted light rays are then directed by the mirror 27 to an angularly disposed, convex mirror 29 and are reflected by mirror 29 toward a pair of jaws 30 which define an exit slit. As a result, a dispersed image of the entrance slit is formed in the region of the exit slit.

In the embodiment of the invention shown in FIGURE 2, the spherically concave collimating mirrors 26 and 27 are employed "off-axis." That is, the virtual point source of the light rays 20, 21 and 22 incident to the mirror 26 is spaced from its optical axis on the side thereof adjacent the jaws 23 forming the entrance slit. Similarly, the light rays adjacent the grating 28 and incident to the mirror 27 are spaced from the optical axis of this mirror. These latter light rays are spaced from the axis of mirror 27 on the side thereof adjacent the jaws 30 forming the exit slit. The angle of incidence of the light striking the mirror 26 is relatively small and is substantially equal to that of the light striking the mirror 27. The collimating mirrors 26 and 27 are positioned on the right side of the apparatus, as viewed in FIGURE 2, while the grating 28 is disposed on the opposite, or left side thereof intermediate the optical axes of mirrors 26 and 27.

With this arrangement, the off-axis aberration contributed by the collimating mirror 26 is opposite in sense to the off-axis aberration contributed by the collimating mirror 27. The powers of these collimating mirrors are equal, and the off-axis aberration introduced by the mirror 26 is substantially cancelled by that introduced by the mirror 27. As a result, the dispersed image at the exit slit is substantially free from off-axis aberration.

The convex mirrors 24 and 29 likewise are employed "off-axis," and the angular disposition of the mirror 24 is opposite to that of the miror 29. Thus, as viewed in FIGURE 2, the extended optical axis of the mirror 24 passes on one side of the collimating device 25 while that of the mirror 29 passes on the opposite side thereof. In addition, the angles of incidence of the light at the mirrors 24 and 29 are relatively large when compared with the angles of incidence of the light striking the collimating device, and the powers of these mirrors are equal and are of the same sense: that is, they are both convex. The off-axis aberration contributed by the mirror 24 is cancelled by the off-axis aberration contributed by the mirror 29, and an accurate image is formed in the region of the exit slit.

The collimating mirrors 26 and 27 contribute a net amount of astigmatism which, if not corrected, would for many applications adversely affect the quality of the exit slit image. The nature of this astigmatism is such that, in the absence of the mirrors 24 and 29, a first line image of an axial point on the entrance slit would appear in the secondary plane and would intersect the principal ray at a right angle at one point therealong, while a second line image would appear in the primary plane and would intersect the principal ray at a right angle at another point. The angularly disposed convex mirrors 24 and 29 each introduce astigmatic aberrations which are additive and are opposite in sense to the astigmatism resulting from the use of the mirrors 26 and 27. The astigmatic line images, or focal lines, are brought closer together, and the net astigmatic contribution of the collimating mirrors is thereby reduced by that of the convex mirrors 24 and 29. As a result, the accuracy and definition of the exit slit image is improved.

The amount of astigmatic compensation introduced by the mirrors 24 and 29 is largely dependent upon their powers, upon their distances from the entrance and exit slits, respectively, and upon the angles of incidence of the light thereat. For some applications, such as in cases where the accuracy of the exit slit image in the vicinity of the principal ray is of particular importance, the astigmatism introduced by the mirror 24 is made equal to that introduced by the mirror 29 and to one-half the net astigmatic contribution of the collimating mirrors 26 and 27. In this situation, the mirrors 24 and 29 introduce astigmatism with focal lines which, in the vicinity of the principal ray, are parallel to the corresponding astigmatic lines contributed by the collimators 26 and 27, and the astigmatism resulting from the collimating mirrors is cancelled at this point by that contributed by the convex mirrors 24 and 29. As a result, a highly accurate and stigmatic image appears at the slit on the principal ray.

In situations in which astigmatic cancellation occurs at the point of intersection of the exit slit and the principal ray, in the vicinity of other points along this slit the astigmatic contributions of the convex mirrors 24 and 29 are not parallel to those of the collimators 26 and 27 and consequently do not effect complete cancellation. Although for these other points the amount of astigmatism introduced by the collimators is the same as the amount they introduce at the principal ray, the orientation of the resulting focal lines varies along the length of the exit slit. The amount of astigmatism introduced by the convex mirrors 24 and 29 is the same for all points along the slit and its orientation is fixed. Thus, in these situations, the degree of compensation is a maximum for a point on the exit slit at the principal ray and is less for other points therealong.

For applications in which it is advantageous to make the adverse effects of astigmatism negligible over a long section of the exit slit, the exit slit image at the principal ray is overcompensated astigmatically. That is, the net astigmatism introduced by the mirrors 24 and 29 is greater than that resulting from the collimating mirrors 26 and 27. Thus, although some astigmatism appears in the image at the principal ray, complete cancellation occurs at other points along the image, and the net astigmatic effect is greatly reduced. In addition, the deleterious effects of the astigmatism at the principal ray are of little consequence since, in the FIGURE 2 embodiment, the exit slit is parallel to the astigmatic image at this point. As a result an extremely accurate image appears at the exit slit.

The degree of astigmatic overcompensation in a given system depends in large measure on the configuration and disposition of the angularly disposed mirrors and on their relationship with respect to the other system components. However, in certain particularly advantageous arrangements, the overcompensation afforded by these mirrors preferably is within the range of from about one-tenth to one-half of the net astigmatic contribution of the collimators. For systems employing astigmatic overcompensation outside this range, the resulting advantageous effects are not realized to their fullest extent.

Whether the astigmatic contributions of the angularly disposed mirrors, such as the mirrors 10 and 14 of FIGURE 1 or the mirrors 24 and 29 of FIGURE 2, are additive or opposed depends for the most part on the sense of the powers of these mirrors with respect to each other and to the collimator. Thus, in situations where it is desired to reduce or eliminate astigmatism contributed to the dispersed image as a result of the collimating device, the sense of the powers of the angularly disposed mirrors is the same and is opposite to that of the collimator. That is, both mirrors are convex, as shown for example by the mirrors 24 and 29 in FIGURE 2, and the astigmatic contributions of these mirrors are additive and are opposed to the astigmatism resulting from the collimating device. If the powers of the mirrors are of opposite sense, as shown by the concave mirror 10 and the convex mirror 14 in FIGURE 1, the astigmatic contribution of one mirror is reduced or eliminated by that of the other mirror.

Whether the off-axis aberrations contributed by the angularly disposed mirrors are additive or opposed depends not only upon the relative sense of their powers but also upon the angular disposition of the mirrors with respect to the light rays incident thereto. As indicated heretofore, the angle of incidence of the light striking each of these mirrors is large with respect to that of the light striking the collimating device. Additionally, the angular position of the mirror 14 in FIGURE 1 is opposite to that of the mirror 10, and the angular position of the mirror 29 of FIGURE 2 is opposite to that of the mirror 24. That is, in each of these embodiments, the optical axes of the angularly disposed mirrors pass on opposite sides of the collimating device. In situations of this type, where it is desired to introduce a net off-axis aberration to compensate for the off-axis aberration contributed by the collimating device, the powers of the mirrors are of opposite sense, as shown by the mirrors 10 and 14 in FIGURE 1. The off-axis aberrations contributed by these angularly disposed mirrors are additive and reduce or eliminate the off-axis aberration resulting from the collimator. Where the sense of the powers of the angularly disposed mirrors are the same, as shown in FIGURE 2, the off-axis aberration introduced by one mirror reduces or eliminates that introduced by the other.

The powers and dispositions of the various mirrors in a given system may be determined, for example, by calculating the magnitudes of the astigmatism and off-axis aberration introduced by the collimating means and the corresponding magnitudes introduced by a preliminary choice of the powers and dispositions of the angularly disposed mirrors. As indicated heretofore, the magnitude of the error resulting from the off-axis aberration introduced by a particular mirror is roughly proportional to the distance between the intersection of the reflected side rays and the reflected principal ray, when measured in a direction perpendicular to the principal ray (e.g., the distance X—X in FIGURE 1). The magnitudes of the astigmatism introduced by the various mirrors may be calculated in accordance with known methods of geometrical optics, and useful preliminary choice may be made from calculation of the location of the astigmatic images formed by the mirrors, utilizing the different focal lengths of the mirrors in the primary and secondary planes.

The powers and dispositions of the mirrors are then varied until the desired degree of cancellation is achieved. It has been ascertained that the magnitude of the error resulting from the off-axis aberration introduced by a particular mirror varies approximately linearly as the angle between the incident principal ray and the mirror axis (the angle off-axis) and as the cube of the angular width of the light beam, and, through the use of these relationships, the final selection of the powers and dispositions of the mirrors to produce optimum results is greatly facilitated.

In certain types of optical apparatus, it is advantageous to employ both a prism monochromator, such as that shown in FIGURE 1, and a grating monochromator, such as that shown in FIGURE 2. One illustrative arrangement of this type which has been found to give good results includes mirrors having radii of curvature and dispositions as follows:

FIGURE 1

| Component | Radius of curvature, inches | Angle off-axis, degrees | Distance |
|---|---|---|---|
| Concave mirror 10 | 80 | 47 | 3¾″ from entrance slit. |
| Collimator 11 (First Reflection) | 43 | 5½ | 20¾″ from concave mirror 10. |
| Collimator 11 (Second Reflection) | 43 | 3½ | 18¼″ from convex mirror 14. |
| Convex mirror 14 | 58 | 50 | 4″ from exit slit. |

FIGURE 2

| | | | |
|---|---|---|---|
| Convex mirror 24 | 35 | 40 | 2⅝″ from entrance slit. |
| Collimator 26 | 59 | 3½ | 27¼″ from convex mirror 24. |
| Collimator 27 | 59 | 3½ | 27¼″ from convex mirror 29. |
| Convex mirror 29 | 35 | 40 | 25⅝″ from exit slit. |

These radii, angles and distances are, of course, purely illustrative. In addition, it will be apparent that a prism monochromator or a grating monochromator employing such radii, angles and distances may be used separately, rather than in a single optical apparatus, without departing from the spirit or scope of the invention.

Figure 3:
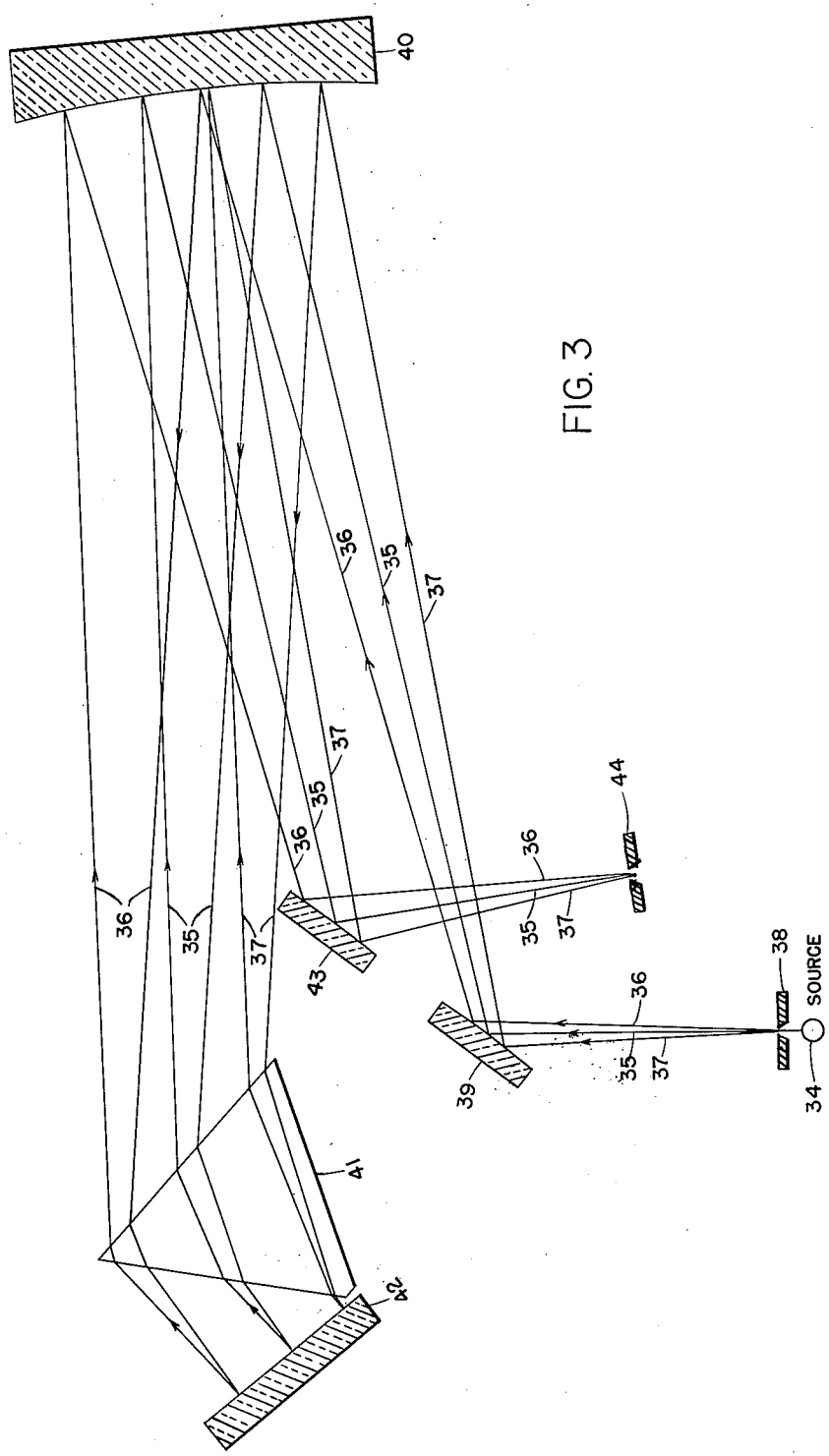
FIGURE 3 is a schematic horizontal view, similar to FIGURE 1, but illustrative of a third embodiment of the invention.

In situations in which the optical axes of the angularly disposed mirrors extend on the same side of the collimating device, rather than on opposite sides as shown in FIGURES 1 and 2, the off-axis aberrations introduced by these mirrors are additive when their powers are of the same sense; i.e., either both concave or both convex. A monochromator employing angularly disposed mirrors in accordance with this latter arrangement is shown in FIGURE 3. A pencil of light, represented by a principal ray 35 and two side rays 36 and 37, enters the monochromator from a suitable source 34 through a pair of jaws 38 which define an entrance slit. The light rays pass through the entrance slit and are reflected by an obliquely disposed convex mirror 39 toward a spherically concave collimating mirror 40. The light at the entrance slit is spaced a considerable distance from the optical axis of the mirror 39, and the position of the mirror 39 is such that the light striking this mirror is spaced from the optical axis of the collimating mirror 40. The angle of incidence of the light at the mirror 39 is large with respect to that of the light at the collimating mirror.

The light rays 35, 36 and 37 are reflected by the collimating mirror 40 and then pess through a prism 41 where they are dispersed, strike a Littrow mirror 42, are returned to the prism 41 for a second dispersion and are again directed toward the collimating mirror 40. The position of the prism 41 is such that, after the second dispersion, the principal light ray 35 intersects the optical axis of the collimator at a small, oblique angle.

The dispersed light rays 35, 36 and 37 are reformed by the collimating mirror 40 and are directed toward an obliquely disposed convex mirror 43. The mirror 43 is in substantial coplanar alignment with the mirror 39 and is located on the side thereof adjacent the collimating mirror 40. As a result, the extended optical axes of these angularly disposed mirrors are substantially parallel and pass on the same side of the collimator. The dispersed light rays are reflected by the mirror 43 toward a pair of jaws 44 which define an exit slit and are located adjacent the entrance slit jaws 38. As a result, a dispersed image of the entrance slit is formed in the region of the exit slit.

With the arrangement shown in FIGURE 3, the off-axis aberrations introduced by the angularly disposed mirrors 39 and 43 are additive and are opposite in sense to the off-axis aberration resulting from the use of the spherical collimating mirror 40. As indicated heretofore, the angles of incidence of the light at the mirror 39 and at the mirror 43 are each large when compared with the angle of incidence of the light at the collimating mirror. The powers and angular dispositions of these mirrors are such that the off-axis aberration introduced by the mirror 39 is substantially equal to that introduced by the mirror 43 and to one-half the off-axis aberration resulting from the use of the collimator. Consequently, the off-axis aberration contributed by the collimating mirror is cancelled by the off-axis aberrations introduced by the mirrors 39 and 43, and the dispersed image at the exit slit is substantially free from off-axis aberration.

As indicated heretofore, the angularly disposed mirrors 39 and 43 are both convex. Each of these mirrors introduces astagmatic aberrations which are additive and are opposite in sense to the astigmatism resulting from the use of the collimating mirror 40. The astigmatism contributed by the collimating mirror is reduced by that introduced by the convex mirrors 39 and 43, and an extremely accurate and well-defined image appears at the exit slit between the jaws 44.

It will thus be apparent that, depending upon the purposes of a given optical apparatus and the nature and relative importance of the aberrations introduced therein, by providing angularly disposed mirrors having powers of the same or the opposite sense and by properly positioning the mirrors relative to each other and to the collimator, either off-axis aberration, astigmatic aberration, or both, may be reduced or eliminated from the exit slit image.

Although in the arrangement shown in FIGURE 3, two substantially coplanar, obliquely disposed convex mirrors 39 and 43 have been employed, it will be apparent that in other arrangements a single convex mirror may be substituted for the mirrors 39 and 43 without departing from the spirit and scope of the invention.

Figure 4:
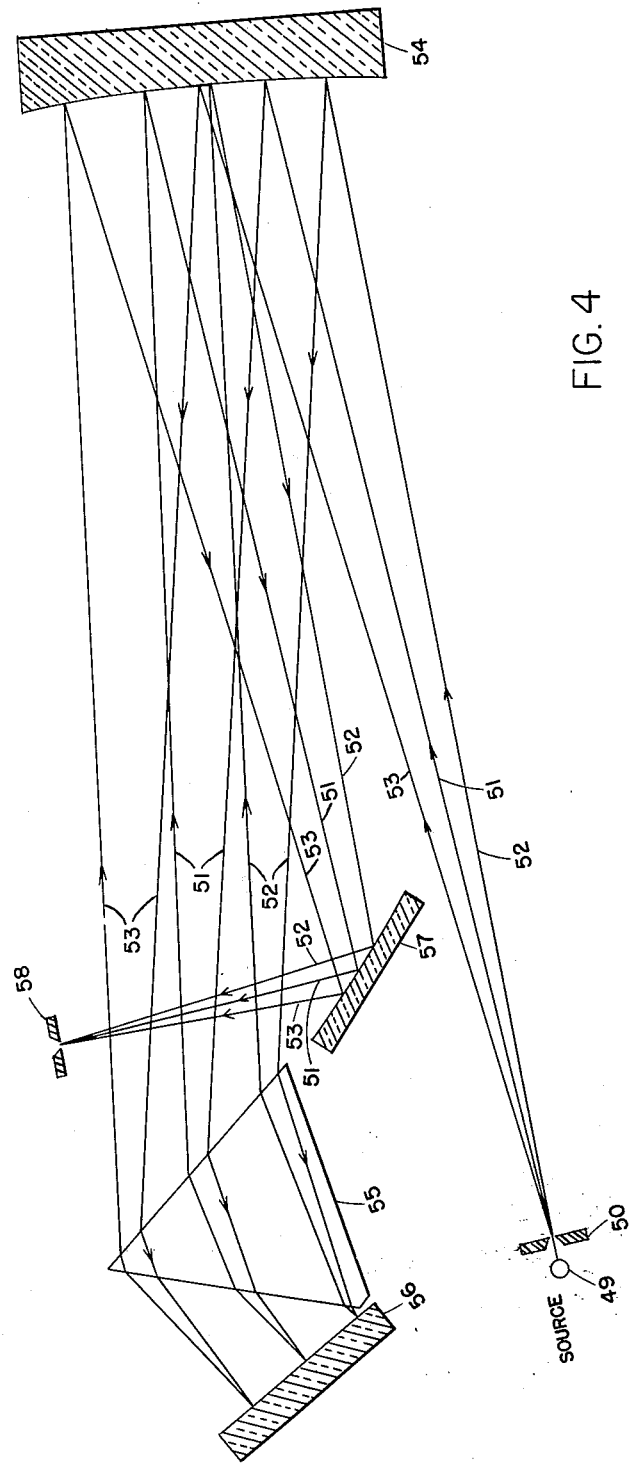
FIGURE 4 is a schematic horizontal view, similar to FIGURE 1, but illustrative of a fourth embodiment of the invention.

Referring now to FIGURE 4 of the drawings, there is shown a monochromator constructed in accordance with a fourth illustrative embodiment of the invention. A pencil of light enters the apparatus from a suitable source 49 through a pair of jaws 50 which define an entrance slit. The light rays, which are represented schematically by a principal ray 51 and two side rays 52 and 53, are directed from the entrance slit toward a spherically concave collimating mirror 54 and are reflected thereby to a prism 55. The light rays 51, 52 and 53 pass through the prism where they are dispersed, strike a Littrow mirror 56, are returned to the prism 55 for a second dispersion, and are again directed toward the collimating mirror 54.

The dispersed light rays 51, 52 and 53 then follow a path from the collimating mirror 54 to an obliquely disposed concave mirror. The mirror 57 is employed "off-axis," and the angle of incidence of the light striking this mirror is large with respect to the angles of incidence of the light directed toward the collimating mirror 54 from the entrance slit and from the prism 55. The dispersed light rays are reflected by the mirror 57 and are directed toward the region of an exit slit defined by a pair of jaws 58. As a result, a dispersed image of the entrance slit appears adjacent the exit slit.

In FIGURE 4, the obliquely disposed mirror 57 introduces off-axis aberration which is opposite in sense to the off-axis aberration which results from the use of the spherical collimating mirror 54. The magnitude of the off-axis aberration introduced by the mirror 57 is dependent for the most part on the power of this mirror and the angular disposition thereof, and advantageously is substantially equal to the off-axis aberration which results from the collimator. As a result, there is formed in the region of the exit slit an accurate image that is free from off-axis aberration.

In each of the illustrated embodiments of the invention, the reflecting surfaces of the angularly disposed mirrors have a spherical configuration. In other advantageous embodiments, these surfaces may be cylindrical or otherwise curved consistent with the maintenance of proper imagery at the exit slit.

Although the invention has particular utility when used in connection with a monochromator, such as those shown in FIGURES 1 through 4, it also may be employed in other types of image forming optical apparatus, such as in photographic systems or other condensing or illuminating systems, for example, where the diminution or removal of aberrations in the optical image is either advantageous or desirable.

The terms and expressions which have been employed are used as terms of description and not of limitation, and there is no intention in the use of such terms and expressions, of excluding any equivalents of the features shown and described, or portions thereof, it being recognized that various modifications are possible within the scope of the invention claimed.

What is claimed is:

1. In an apparatus for producing a portion of a spectrum, in combination, means for admitting light from a source and directing the same along a path, a collimating mirror positioned along said path with its optical axis at an oblique angle with respect thereto, a dispersing element and light receiving means disposed along said path, said collimating mirror and said dispersing element being adapted to form at said receiving means a dispersed image of the light from said source, said collimating mirror tending to produce aberrations in said dispersed image, and mirror means for improving the definition of said dispersed image, said mirror means including a curved reflecting surface angularly positioned in the path of said light in a manner such that the angle of incidence of the light thereat is substantially greater than that of the light at said collimating mirror, said last-mentioned means introducing controlled aberrations in said dispersed image of a sense opposite to the aberrations produced in said image by said collimating mirror, whereby the net aberrations in said image which result from said collimating mirror are reduced.

2. In an apparatus for producing a portion of a spectrum, in combination, means for admitting light from a source and directing the same along a path, collimating means including a collimating mirror positioned along said path with its optical axis at an oblique angle with respect thereto, a dispersing element and light receiving means disposed along said path, said collimating means and said dispersing element being adapted to form at said receiving means a dispersed image of the light from said source, said collimating means tending to produce aberrations in said dispersed image, and an angularly disposed mirror for improving the definition of said dispersed image, said mirror having a spherical reflecting surface positioned in the path of said light, the angular disposition of said reflecting surface being such that the angle of incidence of the light thereat is substantially greater than the angle of incidence of the light at said collimating means, said reflecting surface introducing controlled aberrations in said dispersed image of a sense opposite to the aberrations produced in said image by said collimating means, whereby the net aberrations in said image which result from said collimating means are reduced.

3. In an apparatus for producing a portion of a spectrum, in combination, means for admitting light from a source and directing the same along a path, collimating means including a collimating mirror positioned along said path with its optical axis at an oblique angle with respect thereto, a dispersing element and light receiving means disposed along said path, said collimating means and said dispersing element being adapted to form at said receiving means a dispersed image of the light from said source, said collimating means tending to produce aberrations in said dispersed image, and first and second angularly disposed, off-axis mirrors having curved reflecting surfaces positioned in the path of said light, the angular disposition of each said off-axis mirror being such that the angular of incidence of the light thereat is substantially greater than the angle of incidence of the light at said collimating means, said off-axis mirrors introducing controlled aberrations in said dispersed image of a sense such that the net aberrations in said image which result from said collimating means are reduced.

4. In an apparatus for producing a portion of a spectrum, in combination, means for admitting light from a source and directing the same along a path, collimating means positioned along said path at an oblique angle with respect thereto, a dispersing element and light receiving means disposed along said path, said collimating means and said dispersing element being adapted to form at said receiving means a dispersed image of the light from said source, said collimating means tending to produce aberrations in said dispersed image, first means for receiving the light from said source and directing the same toward said collimating means, and second means for receiving the dispersed light and directing the same toward said light receiving means, said first and said second means each being angularly positioned in the path of said light in a manner such that the angle of incidence of the light thereat is substantially greater than the angle of incidence of the light at said collimating means, said first and second means each introducing controlled aberrations in said dispersed image of a sense opposite to the aberrations produced in said image by said collimating means, whereby the net aberrations in said image are reduced.

5. In an apparatus for producing a portion of a spectrum, in combination, means for admitting light from a source and directing the same along a path, collimating means positioned along said path at an oblique angle with respect thereto, a dispersing element and light receiving means disposed along said path, said collimating means and said dispersing element being adapted to form at said receiving means a dispersed image of the light from said source, said collimating means tending to produce aberrations in said dispersed image, a first mirror having a curved reflecting surface angularly positioned in the path of said light and adapted to receive the light from said source and direct the same toward said collimating means, and a second mirror having a curved reflecting surface angularly positioned in said light path and adapted to receive the dispersed light and direct the same toward said light receiving means, said first and second mirrors each introducing controlled aberrations in said dispersed image of a sense opposite to the aberrations produced in said image by said collimating means, whereby the net aberrations in said image are reduced.

6. In an apparatus for producing a portion of a spectrum, in combination, means for admitting light from a source and directing the same along a path, collimating means including a collimating mirror having a spherical reflecting surface, a dispersing element and light receiving means disposed along said path, said collimating means and said dispersing element being adapted to form a dispersed image of the light from said source, said collimating mirror tending to produce aberrations in said dispersed image, a first off-axis mirror having a curved reflecting surface angularly positioned in the path of said light and adapted to receive the light from said source and direct the same toward said collimating means, and a second off-axis mirror having a curved reflecting surface angularly positioned in said light path and adapted to receive said dispersed image and direct the same toward said light receiving means, said first and said second off-axis mirrors each introducing controlled aberrations in said dispersed image of a sense opposite to the aberrations produced in said image by said collimating mirror, whereby the net aberrations in said image are reduced.

7. In an apparatus for producing a portion of a spectrum, in combination, means for admitting light from a source and directing the same along a path, collimating means including, a collimating mirror having a curved reflecting surface, a dispersing element and light receiving means disposed along said path, said collimating means and said dispersing element being adapted to form a dispersed image of the light from said source, said collimating mirror tending to produce aberrations in said dispersed image, a first mirror having a curved reflecting surface angularly positioned in the path of said light and adapted to receive the light from said source and direct the same toward said collimating means, and a second mirror having a curved reflecting surface angularly positioned in said light path and adapted to receive said dispersed image and direct the same toward said light receiving means, the angular disposition of each of said first and second mirrors being such that the angle of incidence of the light thereat is substantially greater than the angle of incidence of the light at said collimating mirror, said first and said second mirrors each introducing controlled aberrations in said dispersed image of a sense opposite to the aberrations produced in said image by said collimating mirror, whereby the net aberrations in said image are reduced.

8. Apparatus according to claim 7 in which the reflecting surface of one of said angularly positioned mirrors is convex and the reflecting surface of the other of said angularly positioned mirrors is concave.

9. Apparatus according to claim 7 in which the reflecting surface of each of said angularly positioned mirrors is convex.

10. In an apparatus for producing a portion of a spectrum, in combination, means forming an entrance slit for admitting light from a source, means forming an exit slit, and a first mirror, collimating means including a collimating mirror, a dispersing element and a second mirror, for directing said light along a path between said entrance slit and said exit slit and for forming at said exit slit a dispersed image of said entrance slit, said collimating mirror being positioned with its optical axis at an oblique angle with respect to the path of the light incident thereto, whereby said collimating mirror tends to produce aberrations in said dispersed image, but said first mirror and said second mirror each being oriented with its optical axis at an oblique angle with respect to the path of the light incident thereto, the angles of incidence of the light at said first and second mirrors being substantially greater than the angle of incidence of the light at said collimating mirror, to thereby introduce controlled aberrations in said dispersed image of a sense opposite to the aberrations produced in said image by said collimating mirror, whereby the net aberrations in said image are reduced.

11. In an apparatus for producing a portion of a spectrum, in combination, means forming an entrance slit for admitting light from a source, means forming an exit slit, and a first mirror, collimating means including a collimating mirror, a dispersing element and a second mirror, for directing said light along a path from said entrance slit to said first mirror, then to said collimating means, then to said dispersing element, then back to said collimating means, then to said second mirror and then to said exit slit, to thereby form at said exit slit a dispersed image of said entrance slit, said collimating mirror having a spherical reflecting surface positioned with its optical axis at an oblique angle with respect to the path of the light incident thereto, whereby said collimating mirror tends to produce aberrations in said dispersed image, but said first mirror and said second mirror each having a curved reflecting surface oriented with its optical axis at an oblique angle with respect to the path of the light incident thereto, the angles of incidence of the light at said first and second mirrors being substantially greater than the angles of incidence of the light at said collimating mirror, to thereby introduce controlled aberrations in said dispersed image of a sense opposite to the aberrations produced in said image by said collimating mirror, whereby the net aberrations in said image are reduced.

12. In an apparatus for producing a portion of a spectrum, in combination, means forming an entrance slit for admitting light from a source, means forming an exit slit, and a first off-axis mirror, collimating means including a collimating mirror, a dispersing element and a second off-axis mirror, for directing said light along a path from said entrance slit to said first mirror, then to said collimating means, then to said dispersing element, then back to said collimating means, then to said second mirror and then to said exit slit, to thereby form at said exit slit a dispersed image of said entrance slit, said collimating mirror having a spherical reflecting surface positioned with its optical axis at an oblique angle with respect to the path of the light incident thereto, whereby said collimating mirror tends to produce aberrations in said dispersed image, but said first mirror and said second mirror each having a curved reflecting surface oriented with its optical axis at an oblique angle with respect to the path of the light incident thereto, the angles of incidence of the light at said first and second mirrors being substantially greater than the angles of incidence of the light at said collimating mirror and the optical axes of said curved reflecting surfaces extending on opposite sides of said collimating mirror, to thereby introduce controlled aberrations in said dispersed image of a sense opposite to the aberrations produced in said image by said collimating mirror, whereby the net aberrations in said image are reduced.

13. Apparatus according to claim 12 in which the reflecting surface of one of said off-axis mirrors is convex and the reflecting surface of the other of said off-axis mirrors is concave, said collimating mirror tending to produce off-axis aberration in said dispersed image, but each of said off-axis mirrors introducing controlled, off-axis aberration in said image of a sense opposite to the off-axis aberration produced by said collimating mirror.

14. Apparatus according to claim 13 in which each of said off-axis mirrors tends to produce astigmatism in said dispersed image, and in which the astigmatism produced by said one off-axis mirror is opposed by the astigmatism produced by said other off-axis mirror.

15. Apparatus according to claim 12 in which the reflecting surface of each of said off-axis mirrors is convex, said collimating mirror tending to produce astigmatism in said dispersed image, but each of said off-axis mirrors introducing a controlled amount of astigmatism in said image of a sense opposite to the astigmatism produced by said collimating mirror.

16. Apparatus according to claim 15 in which the maximum amount of astigmatism introduced by said off-axis mirrors overcompensates for the astigmatism produced by said collimating mirror, the degree of overcompensation being within the range of from about one-tenth to one-half of the astigmatism produced by said collimating mirror.

17. In an apparatus for producing a portion of a spectrum, in combination, means forming an entrance slit for admitting light from a source, means forming an exit slit, and a first mirror, a collimating mirror, a dispersing element and a second mirror, for directing said light along a path from said entrance slit to said first mirror, then to said collimating mirror, then to said dispersing element, then back to said collimating mirror, then to said second mirror and then to said exit slit, to thereby form at said exit slit a dispersed image of said entrance slit, said collimating mirror having a spherical reflecting surface positioned with its optical axis at an oblique angle with respect to the path of the light incident thereto, whereby said collimating mirror tends to produce aberrations in said dispersed image, but said first mirror and said second mirror each having a curved reflecting surface oriented with its optical axis at an oblique angle with respect to the path of the light incident thereto, the angles of incidence of the light at said first and second mirrors being substantially greater than the angles of incidence of the light at said collimating mirror and the optical axes of said curved reflecting surfaces extending on the same side of said collimating mirror, to thereby introduce controlled aberrations in said dispersed image of a sense opposite to the aberrations produced in said image by said collimating mirror, whereby the net aberrations in said image are reduced.

18. Apparatus according to claim 17 in which the reflecting surfaces of said first mirror and said second mirror are convex, and the optical axes thereof are positioned in substantially parallel relationship with each other.

19. In an apparatus for producing a portion of a spectrum, in combination, means forming an entrance slit for admitting light from a source, means forming an exit slit, and a first off-axis mirror, a collimating mirror, a dispersing element, reflecting means and a second off-axis mirror, for directing light along a path from said entrance slit to said first off-axis mirror, then to said collimating mirror, then to said dispersing element for a first dispersion, then to said reflecting means, then back to said dispersing element for a second dispersion, then back to said collimating mirror, then to said second off-axis mirror and then to said exit slit, to thereby form a dispersed image of said entrance slit at said exit slit, said collimating mirror having a spherically concave reflecting surface positioned with its optical axis at an oblique angle with respect to the path of the light incident thereto, whereby said collimating mirror tends to produce aberrations in said dispersed image, but said first off-axis mirror and said second off-axis mirror each having a spherical reflecting surface oriented with its optical axis at an oblique angle with respect to the path of the light incident thereto, the angles of incidence of the light at said first and second off-axis mirrors each being substantially greater than the angles of incidence of the light at said collimating mirror, to thereby introduce controlled aberrations in said dispersed image of a sense opposite to the aberrations produced in said image by said collimating mirror, whereby the net aberrations in said image are reduced.

20. In an apparatus for producing a portion of a spectrum, in combination, means forming an entrance slit for admitting light from a source, means forming an exit slit, and a first off-axis mirror, a first collimating mirror, a diffraction grating, a second collimating mirror and a second off-axis mirror, for directing light along a path from said entrance slit to said first off-axis mirror, then to said first collimating mirror, then to said diffraction grating, then to said second collimating mirror, then to said second off-axis mirror and then to said exit slit, to thereby form a dispersed image of said entrance slit at said exit slit, each of said collimating mirrors having a spherically concave reflecting surface positioned with its optical axis at an oblique angle with respect to the path of the light incident thereto, whereby said collimating mirrors tend to produce a net amount of astigmatism in said dispersed image, but said first off-axis mirror and said second off-axis mirror each having a spherically convex reflecting surface oriented with its optical axis at an oblique angle with respect to the path of the light incident thereto, the angles of incidence of the light at said first and second off-axis mirrors each being substantially greater than the angles of incidence of the light at each of said collimating mirrors, to thereby introduce a controlled amount of astigmatism in said dispersed image of a sense opposite to the astigmatism produced in said image by said collimating mirror, whereby the net astigmatism in said image is reduced.

References Cited in the file of this patent

UNITED STATES PATENTS

| | | |
|---|---|---|
| 2,652,742 | Walsh | Sept. 22, 1953 |
| 2,654,287 | Luft | Oct. 6, 1953 |
| 2,797,609 | White | July 2, 1957 |
| 2,874,608 | Beloian | Feb. 24, 1959 |

UNITED STATES PATENT OFFICE
CERTIFICATE OF CORRECTION

Patent No. 3,048,080                      August 7, 1962

John U. White

It is hereby certified that error appears in the above numbered patent requiring correction and that the said Letters Patent should read as corrected below.

Column 4, line 27, for "exit" read -- exist --; column 6, line 59, before "slit" insert -- exit --; column 8, line 11, for "choice" read -- choices --; same column 8, in the table, FIGURE 1, under the heading "Component", line 1 thereof, for "mirrow" read -- mirror --; same column, FIGURE 2, fourth column, line 4 thereof, for "25 5/8" read -- 2 5/8 --; column 10, line 6, after "mirror", first occurrence, insert -- 57 --; column 11, line 30, for "angular" read -- angle --.

(SEAL)     Signed and sealed this 12th day of March 1963.

Attest:

ESTON G. JOHNSON
Attesting Officer

DAVID L. LADD
Commissioner of Patents